US006615286B1

United States Patent
Chobotaro et al.

(10) Patent No.: US 6,615,286 B1
(45) Date of Patent: Sep. 2, 2003

(54) METHOD AND APPARATUS FOR UPDATING DEVICE DRIVER CONTROL DATA

(75) Inventors: Arie Chobotaro, Kyriat Ata (IL); Prashant Sethi, Folsom, CA (US); David Borislav Girshovich, Nazereth-Illit (IL); Michael W. Donlon, Diamond Springs, CA (US); Israel P. Ramirez, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/503,206

(22) Filed: Feb. 14, 2000

(51) Int. Cl.[7] .................................................. G06F 13/00
(52) U.S. Cl. .............................. 710/8; 710/10; 710/36; 710/56; 710/65; 710/74
(58) Field of Search ................................. 710/8, 10, 36, 710/56, 65, 74

(56) References Cited

U.S. PATENT DOCUMENTS 5,579,522 A 11/1996 Christeson et al.
5,644,782 A * 7/1997 Yeates et al. .................. 710/10
5,835,594 A 11/1998 Albrecht et al.
5,930,504 A 7/1999 Gabel
6,138,178 A * 10/2000 Watanabe ....................... 710/8
6,237,019 B1 * 5/2001 Ault et al. ................... 709/104
6,311,232 B1 * 10/2001 Cagle et al. .................... 710/8

* cited by examiner

Primary Examiner—Jeffrey Gaffin
Assistant Examiner—Mohammad O. Farooq
(74) Attorney, Agent, or Firm—Kenyon & Kenyon

(57) ABSTRACT

Control data for a device driver that is stored on a first non-volatile memory is updated by writing new driver control data to a second non-volatile memory. In an embodiment, the new driver control data may be stored on the second non-volatile memory without modifying the control data on the first non-volatile memory. In a further embodiment, a processor reads non-volatile from the first non-volatile memory into a system memory, reads supplemental driver control data from the second non-volatile memory, and updates the set of driver control data in the system memory based on the supplemental driver control data.

20 Claims, 4 Drawing Sheets

SYSTEM 100

METHOD AND APPARATUS FOR UPDATING DEVICE DRIVER CONTROL DATA

FIELD OF THE INVENTION

Embodiments of the present invention provide a method and apparatus for updating device driver control data. More particularly, embodiments of the present invention provide a method and apparatus for modifying the control data that is used by a device driver in a computer system, or for providing new control data to the device driver.

BACKGROUND OF THE INVENTION

A device driver is a program that controls a peripheral device in a computer system. An example of a device driver is a video driver, which controls a video device, such as a cathode ray tube (CRT) monitor. Other examples of device drivers are a keyboard driver, a mouse driver, or a modem driver. In a computer system, device drivers are typically stored on the disk drive. Device drivers contain control data that specify parameters which are used by the device driver to control the peripheral. For example, the control data for a video driver includes timing or mode data, such as dot clock, control register, and watermark data. Dot clock and control register data specify parameters for the timing of signals that are sent to the video display device, and watermark data specifies parameters for the input bandwidth to the video display device.

It is periodically necessary to modify the control data for a device driver. For example, the timing control data for a video device driver may have to be changed when the system configuration changes, such as when a new processor is installed in the system. In addition, it may be necessary to change the device driver control data to fix a flaw in the system. Another example of modifying device driver control data is adding new video driver control data to support a new video display mode that is being added to the system, such as the addition of 1024 bit ×768 bit ×16 bit resolution capability, or a new frequency or clocking scheme. Previously, device driver control data was stored on the same storage medium as the device driver (e.g., a disk memory). In some systems, the control data was hard-coded into the device driver. In other systems, the control data was stored separately on the storage medium. If. the device driver control data is stored on a disk memory, for example, then updating the control data requires that the data stored in the disk memory ("the disk image") be modified. If the driver control data is hard-coded into the driver, then the only practical way to modify the control data is to install a new driver. This can be expensive because drivers are typically as large as one-half a million lines of code, and because different drivers may be produced by different manufactures. Even if the driver control data is stored separately on the disk memory, it is necessary to perform the sometimes expensive and difficult task of modifying the disk memory. If an organization is operating a network that has hundreds of personal computers, for example, this may require the organization's Information Technology (IT) department to back-up and restore the disk image for each of these computers because the disk memories may contain user data or other software.

Based on the foregoing, there is a need for a method and apparatus for updating device driver control data without modifying the contents of the storage medium that stores the device driver.

DETAILED DESCRIPTION

Figure 1:
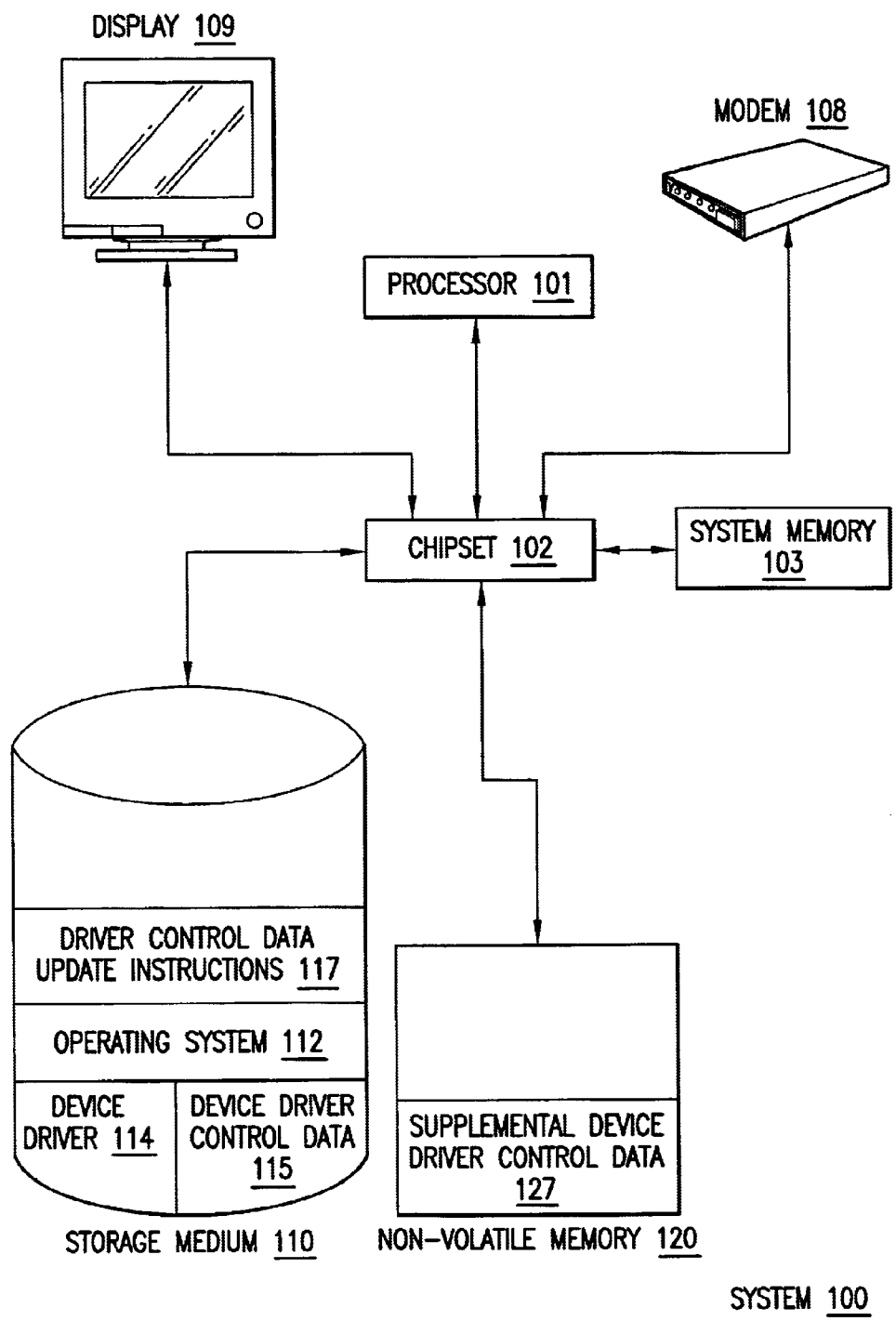
FIG. 1 is a block diagram of a computer system which contains a device driver having control data that may be updated according to one embodiment of the present invention.

Embodiments of the present invention provide a method and apparatus for updating device driver control data without modifying the contents of the storage medium that stores the device driver. FIG. 1 is a block diagram of a computer system 100 which contains a device driver having control data that may be updated according to one embodiment of the present invention. System 100 contains a processor 101 coupled to a chipset 102. The chipset may be coupled to a system memory 103 and a number of peripheral devices such as modem 108, display 109, and storage medium 110. The chipset is also coupled to non-volatile memory 120. Processor 101, system memory 103, modem 108, display 109, and storage medium 110 may be coupled to chipset 102 by one or more busses and may communicate with each other through chipset 102. The term "coupled" is intended to encompass and be broader than the term "directly connected," and also includes the term "indirectly connected."

Processor 101 may be a general purpose microprocessor, such as the Pentium II® processor made by the Intel Corporation® of Santa Clara, Calif., or may be an application specific processor. System memory may be, for example, 64K of DRAM. Modem 108 may be connected through a telephone system to a network such as the Internet. Display 109 may be a standard computer display device such as a CRT monitor or a liquid crystal diode (LCD) display.

Storage medium 110 may be a computer disk driver or other non-volatile memory device and may store an operating system 112 (such as Microsoft® Windows98®), a device driver 114, and device driver control data update instructions 117. Device driver 114 may be, for example, a video device driver that controls display 109. Device driver 114 could also be, for example, a modem device driver that controls modem 108. Device driver 114 contains device driver control data 115, which specifies parameters used by device driver 114 to control a peripheral. For example, assuming that device driver 114 is a video device driver, control data 115 may the mode data or timing data used by video device driver 114 to control display 109. In this example, control data 115 may be 8 KiloBytes in size. Although only one device driver 114 is shown in FIG. 1, storage medium 110 typically stores multiple device drivers. In addition, storage medium 110 also may store other programs and data. Device driver 114 and device driver control data update instructions 117 may or may not be part of the operating system 112.

FIG. 1 shows non-volatile memory 120 containing supplemental device driver control data 127. Non-volatile memory 120 may be, for example, a 256 KiloBytes or 1 MegaByte flash memory. In the alterative, non-volatile memory 120 may be on the processor chip or may be a second disk storage device. A person of skill in the art will appreciate that non-volatile memory, 120 may be any non-volatile memory device.

In one embodiment, supplemental device driver control data 127 is used by device driver 114 in addition to, or instead of, some or all of control data 115. Supplemental device driver control data 127 may be organized as a data structure, as discussed below with reference to FIG. 4. Supplemental device driver control data 127 may be stored on non-volatile memory 120 as part of a firmware hub. In a further embodiment, supplemental device driver control data 127 may be stored on non-volatile memory 120 as part of Basic Input Output System (BIOS) supplemental data.

Driver control data update instructions 117 are executed by processor 101 to modify or add to the control data used by one or more device drivers. For example, control data update instructions 117 may be performed to update the driver control data used by device driver 114 through a modification of supplemental device driver control data 127. The driver control data update instructions 117 may be implemented, for example, in a high level procedural or object-oriented compiled or interpreted programming language. However, the programs can be implemented in assembly or machine language.

Figure 2:
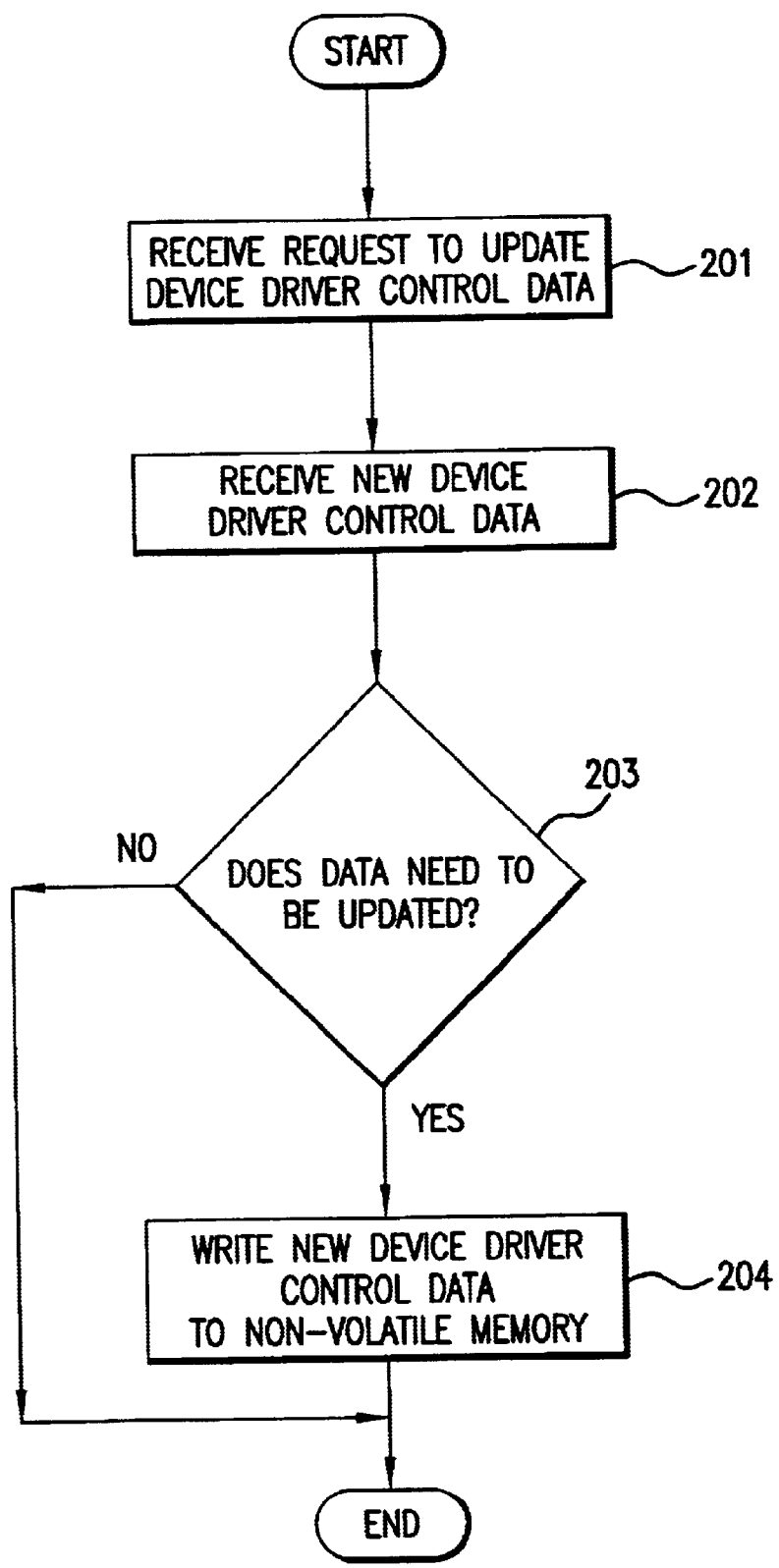
FIG. 2 is a flow chart of a method of updating control data for a device driver according to one embodiment of the present invention.

FIG. 2 shows a flow chart of a method of updating device driver control data according to one embodiment of the present invention. A request to update device driver control data is received (201), and new device driver control data is received (202). The new device driver control data may be received, for example, through modem 108 over a network such as the Internet. In another embodiment, new device driver control data may be received over a local area network from a server. A person of ordinary skill in the art would appreciate that the new device driver control data may be provided by any other known means. In one embodiment, the device driver control data update instructions 117 compares the new device driver control data with the supplemental device driver data 127 stored on non-volatile memory 120 to determine if the supplemental device driver data 127 already contains the updated data (203). If the non-volatil memory 120 already contains the supplemental data, then it does not need to be updated and the process terminates. If the non-volatile memory 120 does not contain the supplemental data or contains different supplemental data, then the new device driver control data is written (204) to non-volatile memory 120.

Figure 3:
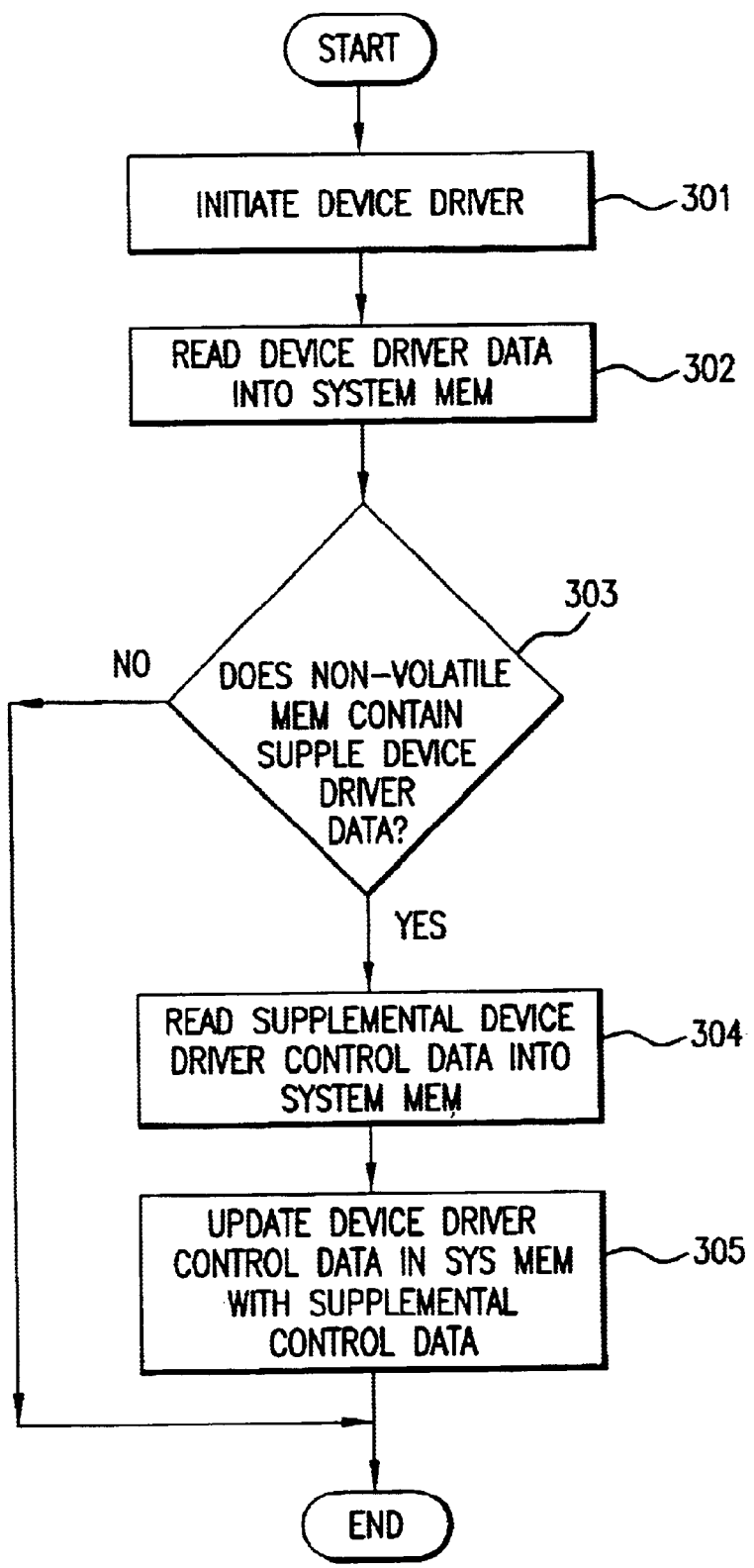
FIG. 3 is a flow chart of a method by which a disk driver may obtain supplemental control data according to one embodiment of the present invention.

One method by which the device driver obtains supplemental device driver control data is shown in FIG. 3. According to one embodiment, the device driver may need to update its control data whenever the device driver is initiated (301). Device driver control data 115 is then read (302) from the non-volatile memory 120 into the system memory 103. The device driver may determine if the non-volatile memory 120 contains supplemental device driver control data (303). If the non-volatile memory does not contain supplemental device driver control data, then the control data 115 may be used, and the device driver proceeds to normal operation without updating the driver control data. If the non-volatile memory does contain supplemental device driver control data 127, then the supplemental device driver control data 127 is read into system memory (304) and the device driver control data 115 that had been read into system memory is replaced or added to with the supplemental device driver control data (305). According to one embodiment, the supplemental control data is read by reading the size of the data structure and caching the entire data structure into system memory as a block. In a further embodiment, prior to using the supplemental control data, a checksum for the data structure is verified and a data structure version is read to determine the version of the data structure being used. In another embodiment, the device driver 114 accesses the supplemental device driver control data 127 indirectly though driver control data update instructions 117.

Figure 4:
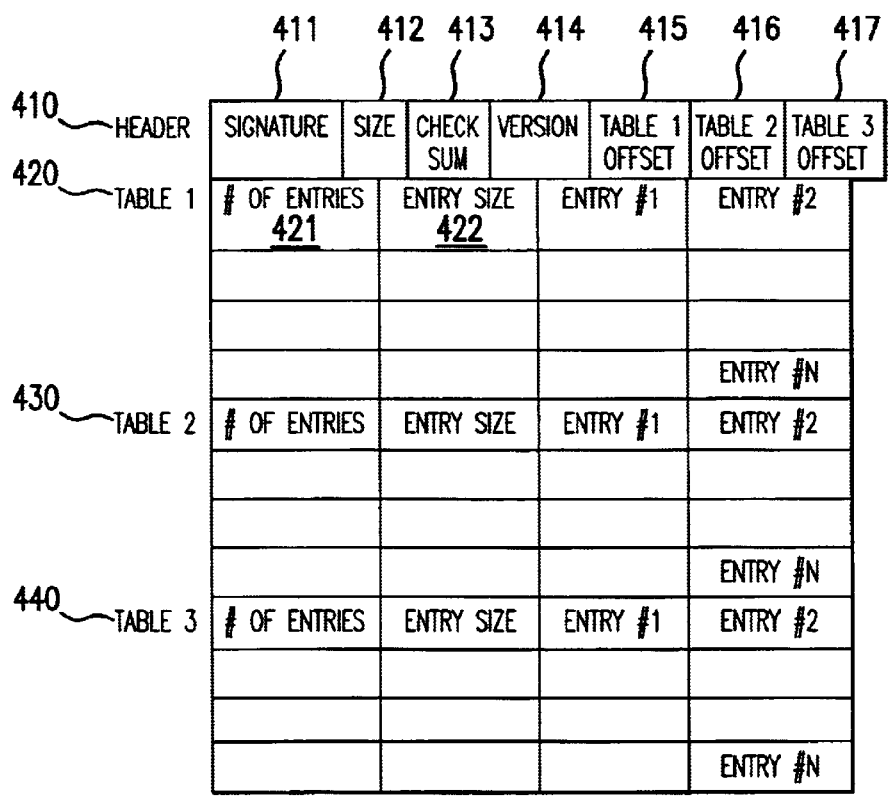
FIG. 4 is a diagram of a device driver supplemental control data table according to one embodiment of the present invention.

An embodiment of a device driver supplemental control data structure is shown in FIG. 4. The supplemental control data structure 400 shown in FIG. 4 contains a header 410 and three tables 420, 430, and 440. The header may contain a signature field 411, a size field 412, a checksum field 413, a version field 414, and three table offset fields 415, 416, and 417. The signature field 411 may be, for example, a string of 8 characters and may be used to identify the supplemental control data table 400 in non-volatile memory device 120. The size field 412 may contain the size of structure 200 (for example, 8 KiloBytes) and may be used by the device driver 114 when reading the device driver supplemental data. The checksum 413 may be used to verify the validity of the table 200, and the version 414 may be used to determine which version of the supplemental driver control data structure is being used. Each table offset field contains the offset to the address of one of the tables. For example, table offset 415 may be the offset to table 420, table offset 416 may be the offset to table 430, and table offset 417 may be the offset to table 440.

Each table may contain: a field for the number of entries; an entry size field; and one or more table entries. For example, table 420 may contain a number of entries field 421 that specifies the number n of entries in table 420, and an entry size field 422 that specifies the size of each entry in table 420. Each table may contain a different type of driver control data. Tables 420, 430, and 440 may be, for example, a dot clock data table, a control register data table, and a watermark data table. In this example, the number of entries in the dot clock data table typically may be 50, and the size of each entry typically may be 25 bytes.

The driver control data update instructions 117 may add a new table to structure 400 by appending a new table offset to the end of header 410 and by appending the new table itself after the end of the last table. If the structure were as shown in FIG. 4, for example, a new fourth table may be added by appending a table-four offset after the end of header 410, and by appending the forth table to the end of the third table 440. Similarly, new entries may be added to any of the tables by increasing the number of entries field and by appending the new entries to the end of the table. In this way, the content of the device driver supplemental data may be easily modified in the future. Although structure 400 is described herein, supplemental device driver data 127 may be stored using other data structures.

In one embodiment, the device driver 114 determines whether an item of supplemental driver control data 127 corresponds to an item of device driver control data 115 that has been read into system memory 103. If the item of supplemental data corresponds to an item of driver control data in system memory, the device driver replaces the item of driver control data in system memory with the corresponding supplemental driver control data. If the item of supplemental data does not correspond to any item of driver control data is system memory, the device driver adds the item of supplemental driver control data to the driver control data stored in system memory.

If, as in the example above, structure 400 contains supplemental control data for a video driver, then the nth entry in each table, taken as a set of parameters, may specify a single video driver "mode." An example of a video driver mode might be one that supports 1024 bit×768 bit ×16 bit resolution. A video driver mode may be specified, for example, by the 3$^{rd}$ entry in dot clock data table 420, the 3$^{rd}$ entry in control register data table 430, and the 3$^{rd}$ entry in watermark data table 440. A new video driver mode may be added in this example by adding a new entry to the dot clock data table 420, the control register data table 430, and watermark data table 440. In addition, a new mode may be disabled by clearing the entry for that mode in each table.

Embodiments of the present invention provide device drivers with forward compatibility, and allow for driver control data updates, without modifying the contents of the storage medium that stores the device driver. Although several embodiments of the present invention are specifically illustrated and/or described herein, it will be appreciated that modifications and variations of the present invention are covered by the above teachings and within the purview of the appended claims without departing from the spirit and intended scope of the invention. The driver control data update instructions may be stored on a different storage medium that the device driver. As a further example, the steps shown in FIGS. 2 and 3 can be re-ordered where appropriate and one or more of those steps may be executed concurrently or omitted. Another example of a modification covered by the above teachings and within the purview of the appended claims is an implementation on computer hardware other than that shown in FIG. 1. In addition, a data structure other than that shown in FIG. 4 may be used in the invention.

What is claimed is:

1. A method of updating control data for a device driver that is stored on a first non-volatile memory, comprising writing new driver control data to a second non-volatile memory, wherein the device driver is a video driver and the control data is video driver mode data, wherein the driver control data is stored on the second non-volatile memory in a structure that comprises a table, wherein the table has n entries, and wherein a video driver mode is specified by one of the entries in the table.

2. The method of claim 1, wherein a new type of video driver control data is provided by adding a new table to the structure, and wherein a new video driver mode is added by adding a new entry to each of the tables.

3. A method of updating device driver control data for a computer system having a non-volatile disk storage device and a second non-volatile memory, comprising:

storing new device driver control data in the second non-volatile memory without modifying data stored in the non-volatile disk storage device, wherein the device driver is a video driver and the control data is video driver mode data, wherein the driver control data is stored on the second non-volatile memory in a structure that comprises a table, wherein the table has n entries, and wherein a video driver mode is specified by one of the entries in the table.

4. The method of claim 3, wherein a new device driver mode is provided by storing a set of mode parameters in the second non-volatile memory.

5. An apparatus for updating the driver control data for a device driver that is stored in a first non-volatile memory, the apparatus comprising:

a first non-volatile memory to store a device driver; and a processor to execute instructions to perform storing new driver control data on a second non-volatile memory, wherein the device driver is a video driver and the control data is video driver mode data, wherein the driver control data is stored on the second non-volatile memory in a structure that comprises a table, wherein the table has n entries, and wherein a video driver mode is specified by one of the entries in the table.

6. The apparatus of claim 5, wherein the device driver is a video driver and the control data is video driver mode data.

7. The apparatus of claim 5, wherein the second non-volatile memory is a flash memory.

8. A method of obtaining supplemental device driver control data for a device driver stored in a first non-volatile memory, comprising:

reading a set of driver control data from the first non-volatile memory into a system memory, wherein the device driver is a video device driver, and wherein the driver control data comprises at least one of dot clock, control register, and watermark data;

reading supplemental driver control data from a second non-volatile memory; and updating the set of driver control data in the system memory based on the supplemental driver control data.

9. The method of claim 8, wherein the first non-volatile memory is a disk memory and the second non-volatile memory is a flash memory.

10. The method of claim 8, wherein updating the set of driver control data in system memory comprises:

determining whether an item of supplemental driver control data corresponds to an item of driver control data in system memory;

if the item of supplemental data corresponds to an item of driver control data in system memory, replacing the item of driver control data in system memory with the corresponding supplemental driver control data; and if the item of supplemental data does not correspond to any item of driver control data in system memory, adding the item of supplemental driver control data to the set of driver control data in system memory.

11. The method of claim 8, wherein the method of obtaining device driver supplemental control data is performed each time that the device driver is initiated.

12. The method of claim 8, further comprising:

determining if the second non-volatile memory contains supplemental driver control data; and using the set of driver control data read from the first non-volatile memory as the driver control data if the second non-volatile memory does not contain supplemental driver control data.

13. The method of claim 8, wherein the supplemental driver control data is stored on the second non-volatile memory in a structure comprising a table, wherein the table has n entries, and wherein a mode is specified by an entry in the table.

14. A computer system, comprising:

a central processing unit;

a system memory;

a first non-volatile memory to stores a device driver; and a second non-volatile memory to stores device driver control data; and a display device wherein the device driver is a video driver, wherein the driver data stored on the second non-volatile memory is to be stored in a structure that comprises a table, wherein the table has n entries, and wherein a video driver mode is specified by one of the entries in the table.

15. The computer system of claim 14, wherein the first non-volatile memory is a disk memory and the second non-volatile memory is a flash memory.

16. A computer-readable medium having stored thereon a device driver and instructions adapted to be executed by a processor, the instructions which, when executed, cause the processor to update the control data for the device driver by:

reading a set of driver control data from a first non-volatile memory into a system memory, wherein the device driver is a video device driver, and wherein the driver control data comprises at least one of dot clock, control register, and watermark data;

reading supplemental driver control data from a second non-volatile memory; and updating the set of driver control data in the system memory based on the supplemental driver control data.

17. The computer-readable medium of claim 16, wherein the first non-volatile memory is a disk memory and the second non-volatile memory is a flash memory.

18. The computer-readable medium of claim 16, wherein updating the driver control data in system memory comprises:

determining whether an item of supplemental driver control data corresponds to an item of driver control data in system memory;

if the item of supplemental data corresponds to an item of driver control data in system memory, replacing the item of driver control data in system memory with the corresponding supplemental driver control data; and if the item of supplemental data does not correspond to any item of driver control data is system memory, adding the item of supplemental driver control data to the set of driver control data in system memory.

19. The computer readable medium of claim 16, wherein the updating the control data is performed each time that the device driver is initiated.

20. The computer readable medium of claim 16, wherein the instructions further cause the processor further to update the control data for the device driver by:

determining if the second non-volatile memory contains supplemental driver control data; and using the set of driver control data from the first non-volatile memory as the driver control data if the second non-volatile memory does not contain supplemental driver control data.

* * * * *